July 5, 1966  J. B. DAVIS  3,259,678
METHOD FOR MANUFACTURING ELECTRICAL COMPONENTS AND THE LIKE
Filed July 7, 1961  2 Sheets-Sheet 1
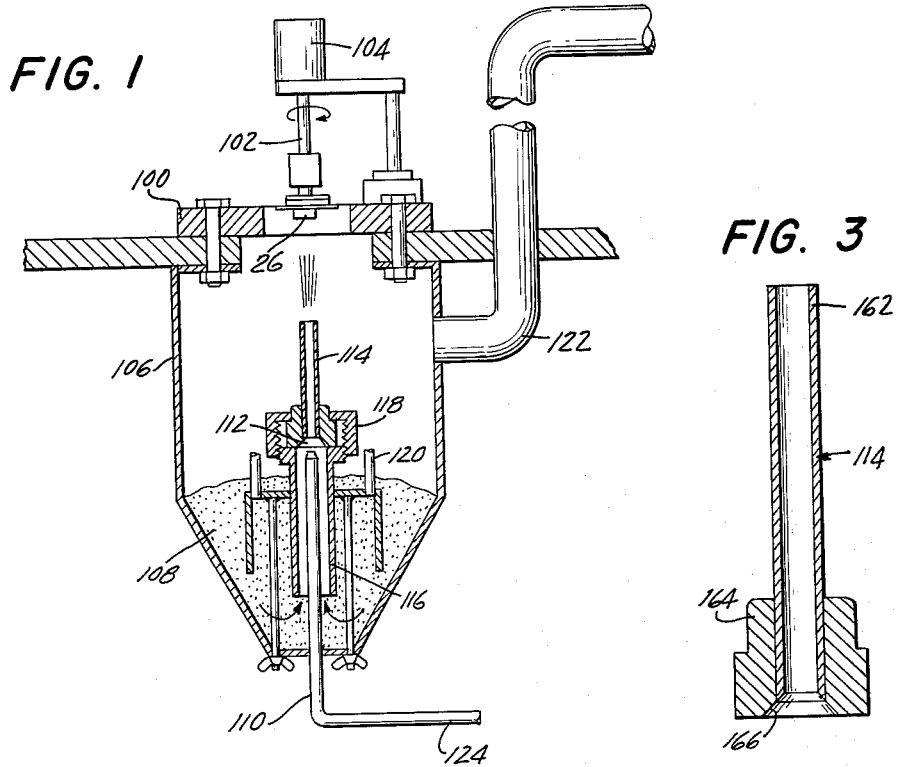
FIG. 1
FIG. 3
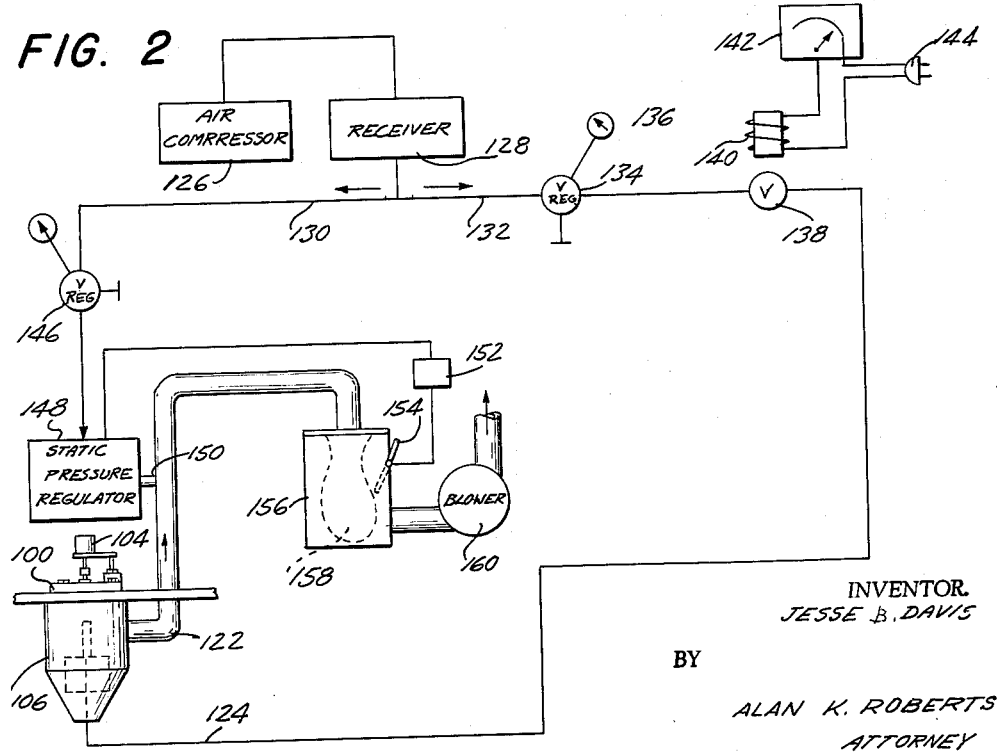
FIG. 2
INVENTOR.
JESSE B. DAVIS
BY
ALAN K. ROBERTS
ATTORNEY July 5, 1966  J. B. DAVIS  3,259,678
METHOD FOR MANUFACTURING ELECTRICAL COMPONENTS AND THE LIKE
Filed July 7, 1961  2 Sheets-Sheet 2
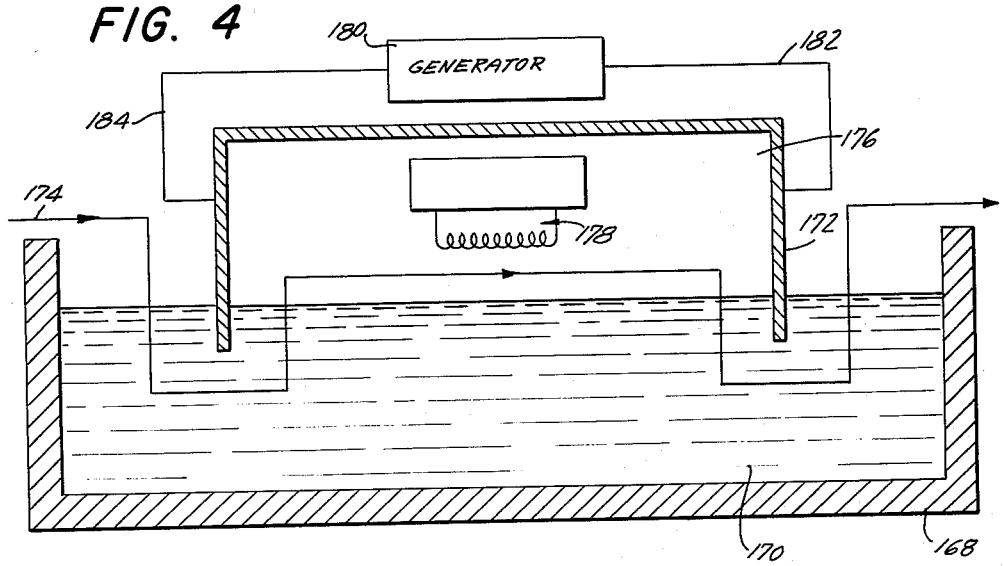
FIG. 4
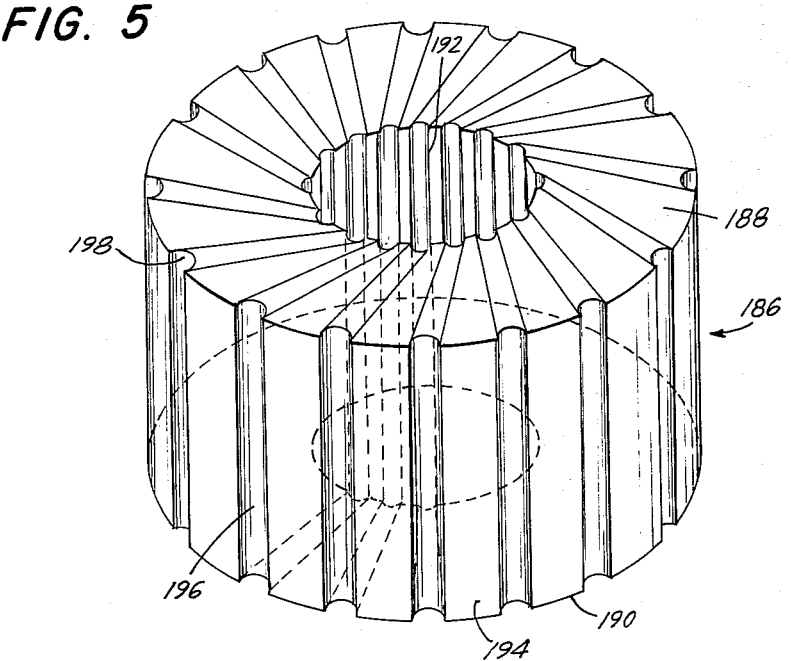
FIG. 5
FIG. 6
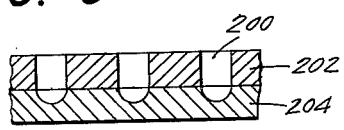
INVENTOR.
JESSE B. DAVIS
BY
ALAN K. ROBERTS
ATTORNEY United States Patent Office 3,259,678
Patented July 5, 1966

3,259,678
METHOD FOR MANUFACTURING ELECTRICAL COMPONENTS AND THE LIKE
Jesse B. Davis, 196 S. Kilburn Road, Garden City, N.Y.
Filed July 7, 1961, Ser. No. 123,388
10 Claims. (Cl. 264—132)

This invention relates to methods for manufacturing electrical components and the like, particularly made of such materials as ceramic or ceramic-like substances including alumina, sapphire, glass, steatite and titanates, as well as ferrite, tungsten carbide and other metallic oxide and carbide mixtures.

It is an object of the invention to provide an improved method for manufacturing components of the above-noted type in a manner which facilitates production and further facilitates the maintaining of very close tolerances.

It is a more specific object of the invention to provide an improved method for manufacturing an electrical component such as a toroidal body in which is to be formed a spiral path wherein may be inserted a metal to constitute a metal "winding".

In achieving the above and other of its objectives, there is contemplated in accordance with the invention, a method which comprises, for example, forming a solid toroidal body with substantially radial faces and circular inner and outer walls extending between these faces. In such walls there are formed evenly spaced axially extending grooves. The aforesaid faces are masked with a substance resistant to a predetermined abrasive such as to leave strips exposed which connect the aforesaid slots in the inner wall with those in the outer wall. These strips and slots constitute a spiral path around the toroidal body. Thereafter an abrasive is propelled at the above-noted faces to erode the strips, whereafter the eroded strips and the slots can be filled with a metal.

The above and further objects and features of the invention will be more clearly understood from the following detailed description as illustrated in the accompanying drawing, in which:

FIGURE 1 diagrammatically illustrates the details of an eroding device employed in accordance with the invention;

FIGURE 2 illustrates the pneumatic system associated with the eroding device of FIGURE 1;

FIGURE 3 illustrates in axial section a nozzle employed in said eroding device;

FIGURE 4 illustrates diagrammatically a technique whereby metal is deposited on articles of manufacture of the invention from a metal carbonyl or the like;

FIGURE 5 illustrates a specific product which is readily fabricated in accordance with the techniques of the invention; and FIGURE 6 is a longitudinal section of a workpiece illustrating a variation of the method of the invention.

An eroding device for practicing the invention is illustrated in FIGURE 1. In FIGURE 1, workpiece 26 mounted on work holder 100 is adapted for being rotated by a shaft 102 and a motor 104. The workpiece is masked with an abrasive resist at selected areas to protect those areas against erosion by an abrasive to be propelled against the same. A chamber 106 is provided with an abrasive 108 which is preferably 150–180 grit silicon carbide or aluminum oxide. Feeding into the chamber 106 is an air tube 110 terminating adjacent the bottom venturi section 112 of nozzle 114. A skirt base 116 is coupled by a coupling nut 118 to the nozzle and there are additionally provided a number of venting pipes 120 which extend above the upper level of the abrasive. A take-away or evacuating conduit 122 is provided along with a supply conduit 124.

The chamber 106 is shown incorporated into a pneumatic system in FIGURE 2, wherein are further illustrated the exhaust conduit 122 and the supply conduit 124.

Also shown in FIG. 2 are a compressor 126 and receiver 128 supplying compressed air via branch lines 130 and 132. A regulating valve 134 is incorporated in line 132 and a gauge 136 is operatively associated therewith. Also incorporated in line 132 is an interrupter valve 138 controlled by a solenoid 140 in turn controlled by an interval timer 142 of conventional construction supplied with electrical power by a source 144.

Incorporated in line 130 is a valve 146 and a static pressure regulator 148. Regulator 148 is provided with a sensing tube 150 extending into exhaust conduit 122 whereby a pressure differential is measured by regulator 148 for use in controlling a control 152 for a damper 154.

Exhaust conduit 122 feeds into a cleaner 156 provided with a dust bag 158, the position of damper 154 controlling the speed with which the pneumatic medium can be exhausted through conduit 122 by means of blower 160.

The erosion device illustrated in FIGURES 1 and 2 is an upshot ejector assembly wherein a self-contained supply of abrasive preferably of the type indicated above is hopper fed into a low pressure area beneath the skirt 116. The low pressure created by the controlled flow of air through the venturi section 112 results in a controlled flow of abrasive, the flow propelling the abrasive vertically upwards against the workpiece which is held in position directly in line with or offset relative to the "hot spot" of the abrasive stream, the workpiece being rotated, or not, as desired, by the motor 104.

The area of the hot spot is closely controlled by the design of the nozzle which is illustrated more particularly in FIGURE 3. In FIGURE 3, the nozzle 114 is shown as comprising a tube 162 supported in a block 164, the venturi section component provided by the block 164 being in the form of a truncated cone 166 enclosing an angle of about 80°.

The intensity of the impinging stream of abrasive is controlled by the ratio of input air pressure and "take-away" vacuum. Depending upon the material of the substrate, the abrasive is propelled at the workpiece to impact against the same with velocities ranging from about 50–1500 feet per second. The depth of the groove or recessed pattern formed in the workpiece is controlled by the time of exposure of the workpiece to the abrasive, in addiiton to the velocity, weight and volume of the abrasive. These features can be empirically determined depending upon the depth of erosion desired. Depths have been successfully controlled to tolerances of ±5 millionths of an inch.

It will be appreciated that what is eroded into the workpiece or article of manufacture is the negative of the abrasive resist pattern. In other words, those portions of the workpiece which are left exposed by the abrasive resist are those portions which are eroded.

The article of manufacture in this intermediate stage is then processed to fill the eroded or recessed pattern with a metal or such other material as is desired be deposited in the substrate. In the case of electrical components, and this expression is intended to cover magnetic and other components as well, the material deposited will be one having predetermined electrical characteristics.

There are many modes by which metal may be deposited in the grooves in the substrate. For example, metals can be sprayed or otherwise plated onto the substrate and then lapped down so that the only metal remaining is that which is positioned in the recessed pattern, or mixtures of powdered metals in suitable vehicles can be doctored or brushed into the grooves and fired in suitable atmosphere furnaces.

There is, however, one particular procedure which lends itself very well to the production of articles of manufacture suitable for microminiaturization and this is a method by which a metal is deposited in the substrate from a readily decomposed and volatile metal bearing compound.

In accordance with this procedure, it is possible to utilize metal carbonyls, nitroxyl compounds, nitrosyl carbonyls, metal hydrides, metal alkyls, metal halides, metal carbonyl halogens, and the like, which are either liquids at normal temperatures and pressure conditions, or gases compressible to liquid under any commercially feasible temperature conditions or solids convertible to liquids at temperatures below the decomposition temperature of the compound, or solutions or carbonyls in volatile solvents such as petroleum ether.

Useful metals which may be deposited from the metallic carbonyl compounds are copper, nickel, iron, chromium, molybdenum, tungsten, cobalt, tellurium, rhenium, and the like.

Illustrated compounds of the other groups are nitroxyls, such as copper nitroxyl, nitrosyl carbonyls, for example, cobalt nitrosyl carbonyl, hydrides, such as tellurium hydride, gelenium hydride, antimony hydride, tin hydride, chromium hydride, the mixed organo-metallo hydrides such as dimethyl alumino hydride, metal alkyls such as tetraethyl lead, metal halides such as chromyl chloride, and carbonyl halogens such as rhodium carbonyl chloride, osmium carbonyl bromide, ruthenium carbonyl chloride, and the like.

The procedure wherby metal may be deposited from a readily decomposed compound is well known for other purposes and will not be described in great detail at this time. However, reference to FIGURE 4 will show diagramatically how the procedure is effected.

In FIGURE 4 is shown a vat 168 in which is accommodated a bath 170 of a fluid such as water. On open bottomed chamber 172 dips into said bath to form a fluid lock therewith. Articles of manufacture are passed in any conventional manner along the path 174 so that for a period of time they are located within the closed chamber 176, wherein their recessed surfaces are heated by a heating means 178.

An atmosphere of said readily decomposed and volatile compound is maintained within the chamber 176 by means of a generator 180. Generator 180 supplies a compound such as metal carbonyl or one of the above compounds by supply line 182 and draws out the gaseous by-products by means of evacuating line 184. Further, generator 180 in conventional and well known manner continuously regenerates and supplies compound to the chamber 176 wherein the articles of manufacture are suitably supplied with metal.

The actual mechanism by which the metal is deposited on the substrates involves thermal activation and this is why the recessed surfaces of the articles of manufacture are heated by heating means 178. The temperatures required are not very high and for the various materials involved, such temperatures can be found in available literature. Nickel carbonyl, for example, starts to decompose at about 175° F. A preferred range of operation, however, is, for example, a range of about 375–400° F.

According to the invention, the entire article of manufacture can have its recessed surface coated and then subsequently milled down so that the sole remaining metal lies completely within the grooves which have been formed.

To better adapt the technique of the invention to mass production requirements, it is possible to treat the abrasive resist, which is maintained atop the substrate, in a manner whereby metal deposition is prevented other than directly in the grooves.

More particularly, the abrasive resist may be treated with a deposition inhibitor such as is indicated in Patent No. 2,970,064 (January 31, 1961). This involves combining with the abrasive resist a polyhydroxy aliphatic such as glycerine ethylene glycol, propylene glycol and so forth.

As is known, during the course of gaseous deposition of the metal from its volatile compund, the inhibitor issues as a vapor and creates a vapor pressure at the surface of the abrasive resist which inhibits deposits of the metal from the metal bearing compound. This enables a selective deposition of the metal in the recessed pattern and avoids the necessity for subsequently lapping or melting the excess metal.

In accordance with the invention, it is possible to fill the recessed pattern to less than complete extent and to cover the metal so deposited with an insulator and finally cover the insulator with additional metal to provide for cross-overs.

A particular form of a product of the invention is illustrated in FIGURE 5 wherein is shown a flat inductor which is adapted for having spirally "wound" thereupon a metal "wire."

In FIGURE 5 is illustrated a toroid 186 having parallel flat or radial faces 188 and 190 and further having concentric inner and outer walls 192 and 194. Toroid 186 may be cast or extruded, but in any event is formed with corresponding axially disposed grooves 196. In fact the axially disposed grooves can also be eroded in accordance with the invention which, in contrast to the known art, can be applied to curved surfaces as well as flat surfaces.

In accordance with the invention, connecting grooves 198 are formed in the faces 188 and 190 in an offset relationship such that strips or grooves 198 and grooves 196 form a continuous spiral-like path around the body of the toroid. The forming of grooves 198 is effected by masking with an abrasive resist and eroding the grooves with an abrasive such as discussed above. The spiral-like path then has deposited therein a metal or other such material by one of the methods which have been discussed above.

Finally, as shown in FIGURE 6, the invention is applicable to cameo as well as intaglio types of processes whereby holes 200 can be cut into a metal coating 202 previously positioned on a substrate 204.

There will now be obvious to those skilled in the art many modifications and variations of the methods, articles of manufacture and apparatus set forth above. These modifications and variations will not, however, depart from the scope of the invention if defined by the following claims.

What is claimed is:

1. A method of manufacturing an electrical component comprising forming a solid toroidal body with substantially flat radial faces and circular inner and outer walls extending between said faces, forming evenly spaced axially extending grooves in said walls, masking said faces with a substance resistant to a predetermined abrasive and leaving strips exposed connecting the slots in the inner wall with respective slots in the outer wall, the strips and slots constituting a spiral path around said body, propelling said abrasive at said faces to erode said strips, and depositing in the eroded strips and the slots a metal from a readily decomposed and volatile metal bearing compound.

2. A method comprising forming a solid toroidal body with substantially flat radial faces and circular inner and outer walls extending between said faces, forming evenly spaced axially extending grooves in said walls, masking said faces with a substance resistant to a predetermined abrasive and leaving strips exposed connecting the slots in the inner wall with respective slots in the outer wall, the strips and slots constituting a spiral path around said body, propelling said abrasive at said faces to erode said strips, and filling the eroded strips and the slots with a metal.

3. A method of manufacturing an electrical component comprising casting a toroidal body with substantially flat radial faces and circular inner and outer walls extending between said faces and with evenly spaced axially extending grooves in said walls, masking said faces with a substance resistant to a predetermined abrasive and leaving strips exposed connecting the slots in the inner wall with respective slots in the outer wall, the strips and slots constituting a spiral path around said body, propelling said abrasive at said faces to erode said strips, and filling the eroded strips and the slots with a metal.

4. In a method of manufacturing an electrical component: the steps comprising forming a toroidal body with substantially flat radial faces and circular inner and outer walls extending between said faces, forming axially extending grooves in said walls, masking said faces with a substance resistant to an abrasive and leaving strips exposed connecting the slots in the inner wall with respective slots in the outer wall, the strips and slots constituting a spiral path around said body, propelling said abrasive at said faces to erode said strips, and filling the eroded strips and the slots with a metal.

5. A method of manufacturing an electrical component comprising extruding a ceramic-like material to form a toroidal body with substantially flat radial faces and circular inner and outer walls extending between said faces, and with axially extending grooves in said walls, masking said faces with a substance resistant to a predetermined abrasive and leaving strips exposed connecting the grooves in the inner wall with respective grooves in the outer wall, the strips and grooves constituting a spiral path around said body, propelling said predetermined abrasive at said faces to erode said strips, and filling the eroded strips and the slots with a metal.

6. A method of manufacturing an electrical component comprising extruding a ceramic-like material to form a toroidal body with substantially flat radial faces and circular inner and outer walls extending between said faces, and with axially extending slots in said walls, masking said faces with a substance resistant to a predetermined abrasive and leaving strips exposed connecting the slots in the inner wall with respective slots in the outer wall, the strips and slots constituting a spiral path around said body, and propelling said predetermined abrasive at said faces to erode said strips.

7. In a method of manufacturing an electrical component from a toroidal body with substantially flat radial faces and circular inner and outer walls extending between said faces, and with axially extending slots in said walls, the steps of masking said faces with a substance resistant to a predetermined abrasive and leaving strips exposed connecting the slots in the inner wall with respective slots in the outer wall, the strips and slots constituting a spiral path around said body, propelling said predetermined abrasive at said faces to erode said strips, and filling the eroded strips and the slots with a metal.

8. A method of manufacturing an electrical component comprising extruding a ceramic-like material to form a toroidal body with end faces and inner and outer walls extending between said faces, and with slots in said walls extending between said faces, masking said faces with a substance resistant to a predetermined abrasive and leaving strips exposed connecting the slots in the inner wall with respective slots in the outer wall, the strips and slots constituting a spiral path around said body, and propelling said predetermined abrasive at said faces to erode said strips, and filling the eroded strips and the slots with a metal.

9. A method of manufacturing an electrical component comprising extruding a ceramic-like material to form a toroidal body with end faces and inner and outer walls extending between said faces, and with slots in said walls extending between said faces, masking said faces with a substance resistant to a predetermined abrasive and leaving strips exposed connecting the slots in the inner wall with respective slots in the outer wall, the strips and slots constituting a spiral path around said body, and propelling said predetermined abrasive at said faces to erode said strips.

10. A method comprising extruding an extrudable material into the form of a body with spaced slots therein, masking said body with a substance resistant to a predetermined abrasive and leaving a strip exposed connecting the slots, and propelling said predetermined abrasive at said body to erode said strip to connect the slots.

References Cited by the Examiner

UNITED STATES PATENTS

| | | | |
|---|---|---|---|
| 1,641,047 | 8/1927 | Poston | 264—162 XR |
| 2,654,861 | 10/1953 | Khouri | 29—155.56 XR |
| 2,799,051 | 7/1957 | Coler et al. | |
| 2,822,600 | 2/1958 | Scott | 264—162 XR |
| 2,888,654 | 5/1959 | Bugg | 336—221 |
| 2,907,968 | 10/1959 | Thurk | 336—221 |
| 2,953,483 | 9/1960 | Torok | 117—212 |
| 2,964,793 | 12/1960 | Blume. | |
| 2,966,429 | 12/1960 | Darrel et al. | 117—212 |
| 2,988,456 | 6/1961 | Fairbanks et al. | 264—162 XR |
| 3,115,423 | 12/1963 | Ashworth | 117—212 |
| 3,123,787 | 3/1964 | Shirfrin | 29—155.56 XR |

FOREIGN PATENTS 154,918   1/1951   Australia.

ROBERT F. WHITE, *Primary Examiner.*

JOHN F. BURNS, *Examiner.*

W. M. ASBURY, J. A. FINLAYSON,
*Assistant Examiners.*